United States Patent
Hu et al.

(10) Patent No.: US 9,910,878 B2
(45) Date of Patent: Mar. 6, 2018

(54) METHODS FOR PROCESSING WITHIN-DISTANCE QUERIES

(71) Applicant: Oracle International Corporation, Redwood Shores, CA (US)

(72) Inventors: Ying Hu, Nashua, NH (US); Siva Ravada, Nashua, NH (US); Daniel Geringer, Germantown, MD (US); Richard J. Anderson, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 358 days.

(21) Appl. No.: 14/452,351

(22) Filed: Aug. 5, 2014

(65) Prior Publication Data

US 2016/0019248 A1    Jan. 21, 2016

Related U.S. Application Data

(60) Provisional application No. 62/027,078, filed on Jul. 21, 2014.

(51) Int. Cl.
   *G06F 17/30* (2006.01)
(52) U.S. Cl.
   CPC .... *G06F 17/30327* (2013.01); *G06F 17/3087* (2013.01); *G06F 17/30* (2013.01);
   (Continued)
(58) Field of Classification Search
   CPC .......... G06F 17/30327; G06F 17/3087; G06F 17/30; G06F 17/30289; G06F 17/30424; G06F 17/30657; G06F 17/30292
   (Continued)

(56) References Cited

U.S. PATENT DOCUMENTS

| 5,574,835 A | 11/1996 | Duluk et al. |
| 6,879,980 B1 * | 4/2005 | Kothuri ............ G06F 17/30241 707/743 |

(Continued)

OTHER PUBLICATIONS

Hu et al , "Topological Relationship Query Processing for Complex Regions in Oracle Spatial", ACM SIGSPATIAL GIS '12, Nov. 6-9, 2012, pp. 3-12.*

(Continued)

*Primary Examiner* — Alex Gofman
*Assistant Examiner* — Kamal Dewan
(74) *Attorney, Agent, or Firm* — Hickman Palermo Becker Bingham LLP (57) ABSTRACT

Techniques and systems for processing within-distance queries are provided. A query for geometry objects within a query distance of a query geometry is received. An in-memory R-tree (IMR-tree) is generated for the query geometry. The IMR-tree includes nodes corresponding to edges of the query geometry. An R-tree index for a plurality of candidate geometries is accessed. At least one node of the R-tree index is processed by: generating an expanded bounding geometry based on the query distance, and using the IMR-tree to determine a topological relationship between the expanded bounding geometry and the query geometry. When the expanded bounding geometry intersects the query geometry, if at least one within-distance test is satisfied, the candidate geometries associated with the selected node are added to a result set. Otherwise, if the selected node is a non-leaf node of the R-tree index, child nodes of the selected node are processed.

20 Claims, 7 Drawing Sheets

(52) U.S. Cl.
CPC .. *G06F 17/30289* (2013.01); *G06F 17/30292* (2013.01); *G06F 17/30424* (2013.01); *G06F 17/30657* (2013.01)

(58) Field of Classification Search
USPC .... 707/722, 791, 718, 743, 769, 797, 999.1, 707/999.003, 999.004, 999.005, 999.101, 707/E17.018, E17.024
See application file for complete search history.

(56) References Cited

U.S. PATENT DOCUMENTS

| | | |
|---|---|---|
| 7,219,108 B2 | 5/2007 | Kothuri et al. |
| 2004/0193566 A1* | 9/2004 | Kothuri ............ G06F 17/30241 |
| 2005/0015216 A1* | 1/2005 | Kothuri ............ G06F 17/30241 |
| | | 702/158 |
| 2005/0203932 A1 | 9/2005 | Kothuri et al. |
| 2005/0222978 A1 | 10/2005 | Dory et al. |
| 2008/0162424 A1 | 7/2008 | Adler et al. |
| 2009/0091568 A1* | 4/2009 | Ravada ............ G06F 17/30592 |
| | | 345/420 |
| 2009/0094010 A1 | 4/2009 | Kothuri et al. |
| 2012/0054195 A1 | 3/2012 | Hu et al. |
| 2012/0166446 A1 | 6/2012 | Bowman et al. |
| 2014/0244635 A1 | 8/2014 | Hu et al. |

OTHER PUBLICATIONS

U.S. Appl. No. 13/780,990, filed Feb. 28, 2013, Office Action, dated Dec. 15, 2014.
U.S. Appl. No. 13/780,990, filed Feb. 28, 2013, Notice of Allowance, dated Apr. 2, 2015.

* cited by examiner

METHODS FOR PROCESSING WITHIN-DISTANCE QUERIES

CROSS-REFERENCE TO RELATED APPLICATIONS

This application claims the benefit of Provisional Appln. 62/027,078, filed Jul. 21, 2014, the entire contents of which is hereby incorporated by reference as if fully set forth herein, under 35 U.S.C. § 119(e). This application is related to: U.S. Pat. No. 7,239,989, entitled "WITHIN-DISTANCE QUERY PRUNING IN AN R-TREE INDEX," filed on Jul. 18, 2003; and application Ser. No. 13/780,990, entitled "METHODS FOR QUERY PROCESSING OF TOPOLOGICAL RELATIONSHIPS AMONG COMPLEX SPATIAL OBJECTS," filed Feb. 28, 2013, the entire contents of which are hereby incorporated by reference as if fully set forth herein.

FIELD OF THE INVENTION

The present invention relates to spatial database systems and geographical information systems, and more particularly to spatial query processing.

BACKGROUND

Spatial database systems are configured to store and manage spatial data. One particular type of spatial database system is a geographical information system (GIS). A GIS is configured to store and operate on geospatial data, or data relating to features on the Earth's surface. Within-distance queries are frequently used in spatial database systems. Given a first spatial object, a within-distance query searches for other spatial objects within a certain distance of the first spatial object. One example of a within-distance query is a query for all cities within a distance of a highway.

The performance of within-distance queries is an important aspect of these systems because of the computational complexity of spatial data searching. Spatial objects can be complex in nature. For example, spatial objects may be represented by geometries defined by many vertices and/or edges. Computing distances between a query geometry and candidate geometries based on their edges and vertices is an expensive operation with respect to time. Often, within-distance queries are used to benchmark the performance of a spatial database system.

Typically, an R-tree index is built ahead of time on candidate geometries, thereby avoiding full table scans when searching for within-distance candidates. Nodes in the R-tree index each correspond to a minimum bounding region, such as a minimum bounding rectangle (MBR). The R-tree index creation process generates a MBR for each indexed spatial object. Ancestor nodes in the R-tree index correspond to MBRs that contain the MBR of every descendant node of the ancestor node.

One method to optimize within-distance queries is to eliminate spatial objects as potential matches within a specified distance. Distances are calculated between an approximation of the first spatial object and approximations of the other spatial objects. The MBR is often used as the approximation. It is much faster to compute distances between the MBRs, which can help eliminate spatial objects that are not within the specified distance. More expensive computations are only necessary if the approximation calculations are not conclusive. However, an MBR often does not accurately describe the first object, and very little advantage is gained.

Thus, there is a need for a solution that effectively speeds up within-distance queries.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques to speed up within-distance queries are described herein. The techniques may be implemented in one or more spatial database systems. A within-distance query returns spatial objects that are within a specified distance of a specified object. Hereafter, the specified distance is referred to as the "query distance" and the specified object is referred to as the "query geometry." An example of a within-distance query is a search for parks within 50 miles of a particular highway, where the query geometry is the highway, and the query distance is 50 miles.

The query is performed over a set of candidate spatial objects that are indexed using an R-tree. The R-tree index may be maintained by one or more spatial database systems that store the candidate spatial objects. Hereafter, the candidate spatial objects are referred to as "candidate geometries." The candidate geometries are indexed using an R-tree. In one embodiment, each node of the R-tree represents an MBR that contains one or more of the candidate geometries, and nodes that descend from a particular node represent MBRs contained within the MBR of the particular node.

First, an in-memory R-tree (IMR-tree) is generated for the query geometry. In prior optimization techniques, the MBR of the query geometry is used. The IMR-tree is a much finer-grained representation of the query geometry than an MBR. The IMR-tree stores boundary data for edges of the query geometry. In one embodiment, the boundary data is stored as MBRs, where each MBR corresponds to a diagonal representing an edge of the query geometry. The use of the IMR-tree to represent the query geometry significantly improves the performance of within-distance queries, especially for complex and large query geometries.

The within-distance query is performed by processing at least one node of the R-tree index. In an embodiment, the nodes of the R-tree index are processed recursively from the root of the R-tree or a subtree thereof. To process a selected node, an expanded bounding geometry is generated by expanding the minimum bounding geometry of the selected node based on the query distance. The IMR-tree of the query geometry is used to determine a topological relationship between the query geometry and the expanded bounding geometry. In one embodiment, the IMR-tree is searched to quickly identify a relevant edge of the query geometry that is within the query distance, which is much faster than naively determining distances from the query geometry as a whole.

The topological relationship may be used to optimize the within-distance query. When the expanded bounding geometry intersects the query geometry, then some of the candidate geometries contained within the MBR of the selected node may be within the query distance of the query geometry. In this case, at least one within-distance test is applied. A within-distance test is an optimization that potentially allows all candidate geometries within the MBR of the selected node to be classified as within the query distance of the query geometry. If a within-distance test is satisfied, the candidate geometries associated with the selected node are added to the result set. In this case, nodes in the subtree that descends from the selected node do not need further processing.

When none of the within-distance tests are satisfied, the child nodes of the selected node are processed, since it is inconclusive whether all the child nodes can be added or eliminated. In one embodiment, child nodes are processed recursively when the expanded bounding geometry of a current node intersects the query geometry, but the within-distance test is not satisfied. If the selected node is a leaf node and has no children, then it is determined if the candidate geometry (as opposed to the corresponding MBR) is within the query distance of the query geometry using the IMR-tree.

Although one or more embodiments are described with respect to MBRs, the techniques described herein are adaptable to other suitable minimum bounding geometries, including minimum bounding geometries in other coordinate systems and/or another number of dimensions.

In-Memory R-Tree ("IMR-Tree")

The IMR-tree stores boundary data for edges of the query geometry. In one embodiment, the boundary data is stored as MBRs, where each MBR corresponds to a diagonal representing an edge of the query geometry. The use of the IMR-tree to represent the query geometry significantly improves the performance of within-distance queries, especially for complex and large query geometries.

Figure 1A:
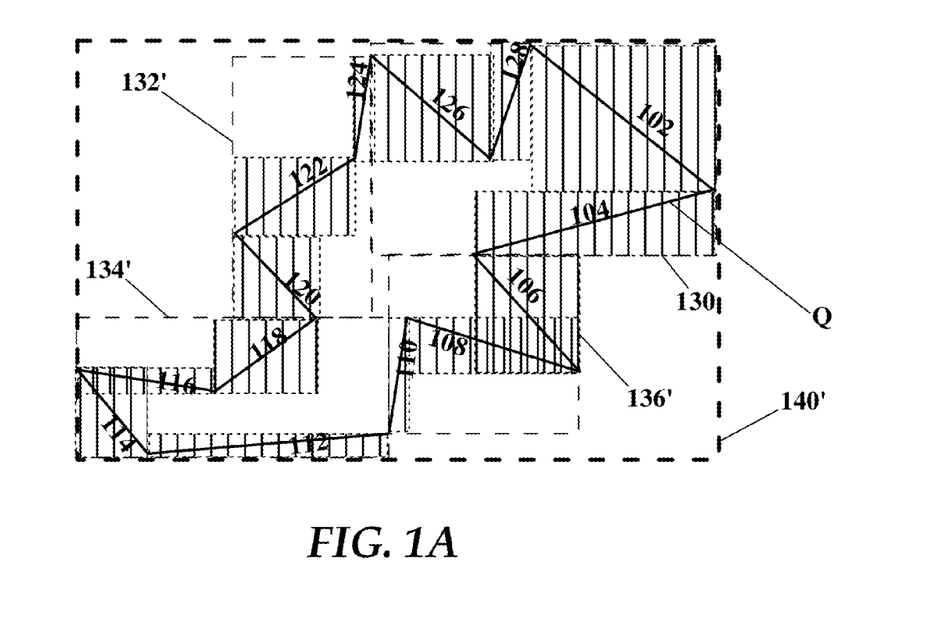
FIGS. 1A-1B illustrates an embodiment of an IMR-tree corresponding to an example query geometry.
Figure 1B:
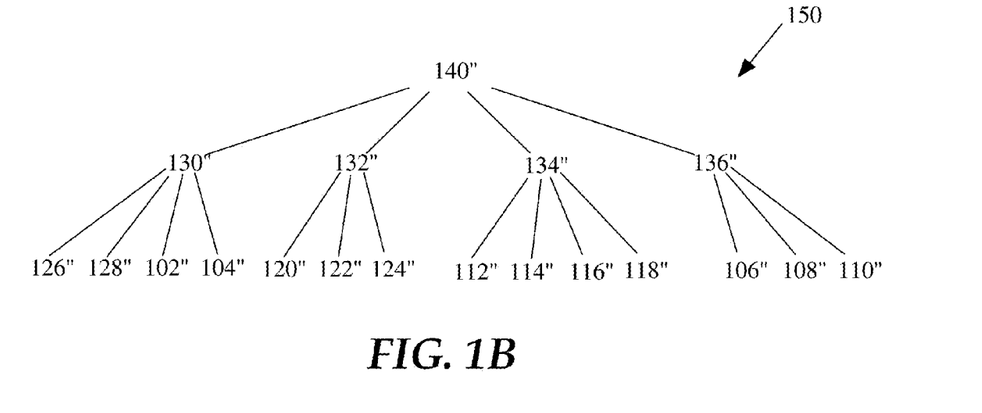

FIGS. 1A-1B illustrates an embodiment of an IMR-tree corresponding to an example query geometry. In FIG. 1A, an example spatial object Q is shown. When spatial object Q is the query geometry in a within-distance query, an IMR-tree will be generated for Q. Query geometry Q has edges 102-128. Edges 102-128 are boundary segments that represent a boundary of query geometry Q. As used herein, the term edge refers to any boundary segment and/or surface of a geometry. In a 2-dimensional (2D) representation, including an orthogonal projection in 2D, the edges may include lines, curves, or any other boundary corresponding to the boundary of the object represented by the query geometry. The minimum bounding geometries may be extended to boundary segments and/or surfaces in any number of dimensions.

A minimum bounding geometry is shown for each edge 102-128. Although the minimum bounding geometries are not labeled, they are denoted hereafter as 102'-128' to indicate the corresponding edge 102-108. Minimum bounding geometries 102'-128' associated with each edge 102-128 are shaded. In one embodiment, query geometry Q is a polygon and the minimum bounding geometries 102'-128' are minimum bounding rectangles (MBRs). Although the MBRs are rectangles in an X-Y orientation, the MBRs and any other minimum bounding geometry may be defined in any orientation and/or coordinate system.

FIG. 1B illustrates an embodiment of an IMR-tree for query geometry Q. IMR-tree 150 is generated for query geometry Q based on its edges 102-128. IMR-tree 150 may be considered an R-tree comprising the edges of a single query geometry Q. The leaf nodes 102"-128" of IMR-tree 150 correspond to minimum bounding geometries 102'-128' of edges 102-128 of query geometry Q.

IMR-tree 150 may also include one or more non-leaf nodes 130"-140". Non-leaf nodes 130"-140" of FIG. 1B are associated with minimum bounding geometries 130'-140' of FIG. 1A. The minimum bounding geometry of a non-leaf node contains all minimum bounding geometries and/or edges of nodes that descend from it. For example, in FIG. 1B, leaf nodes 126", 128", 102" and 104" descend from non-leaf node 130". In FIG. 1A, the minimum bounding geometry 130' shown in FIG. 1A is the minimum bounding geometry for minimum bounding geometries 126', 128', 102' and 104'.

Likewise, the minimum bounding geometry 132' shown in FIG. 1A is the minimum bounding geometry for minimum bounding geometries 120', 122' and 124'; the minimum bounding geometry 134' shown in FIG. 1A is the minimum bounding geometry for minimum bounding geometries 112', 114', 116' and 118'; and the minimum bounding geometry 136' shown in FIG. 1A is the minimum bounding geometry for minimum bounding geometries 106', 108' and 110'.

IMR-tree 150 may include multiple hierarchy levels. For example, non-leaf nodes 130", 132", 134" and 136" descend from root node 140". Root node 140" corresponds to minimum bounding geometry 140' in FIG. 1A. Minimum bounding geometry 140' is the minimum bounding geometry for minimum bounding geometries 130', 132', 134' and 136', as well as the minimum bounding geometries corresponding to all nodes that descend therefrom (i.e. 102'-128').

IMR-tree 150 may be stored in volatile memory or non-volatile memory. The IMR-tree 150 will be used to determine the topological relationship between a potentially large number of minimum bounding geometries corresponding to nodes of the R-tree index maintained for the candidate geometries. Compared to the R-tree index maintained for the candidate geometries, the IMR-tree is typically a much smaller data structure. In one embodiment, IMR-tree 150 is stored in memory to facilitate the processing of the nodes of the R-tree index.

In one embodiment, the query geometry is one of the geometries stored in the spatial database, and is indexed in the R-tree index. When a within-distance query on a query geometry is submitted to a spatial database that also stores the query geometry, the query geometry may be accessed from the spatial database to generate the IMR-tree.

Processing the R-Tree Index

To determine which candidate geometries are within the query distance of the query geometry, one or more nodes of the R-tree index are traversed. In one embodiment, leaf nodes of the R-tree index are each associated with a minimum bounding geometry that contains one of the candidate geometries. Non-leaf nodes of the R-tree index are each associated with a minimum bounding geometry that contains the candidate geometries (and/or the minimum bounding geometries thereof) that are associated with all nodes that descend from the non-leaf node. The root node of the R-tree index corresponds to a minimum bounding geometry that contains all the candidate geometries (and/or the minimum bounding geometries thereof).

To process a selected node, an expanded bounding geometry is generated by expanding the minimum bounding geometry of the selected node based on the query distance. The IMR-tree of the query geometry is used to determine a topological relationship between the query geometry and the expanded bounding geometry. The topological relationship may be used to optimize the within-distance query, which shall be described in greater detail hereafter.

The techniques described herein are compatible with other methods for speeding up within-distance queries, including the optimizations described in U.S. Pat. No. 7,239,989, entitled "WITHIN-DISTANCE QUERY PRUNING IN AN R-TREE INDEX", filed on Jul. 18, 2003, the entire contents of which is hereby incorporated by reference as if fully set forth herein. For example, the above reference describes using interior approximations in association with an R-tree index to speed up within-distance queries.

Expanded Bounding Geometry

Figure 2:
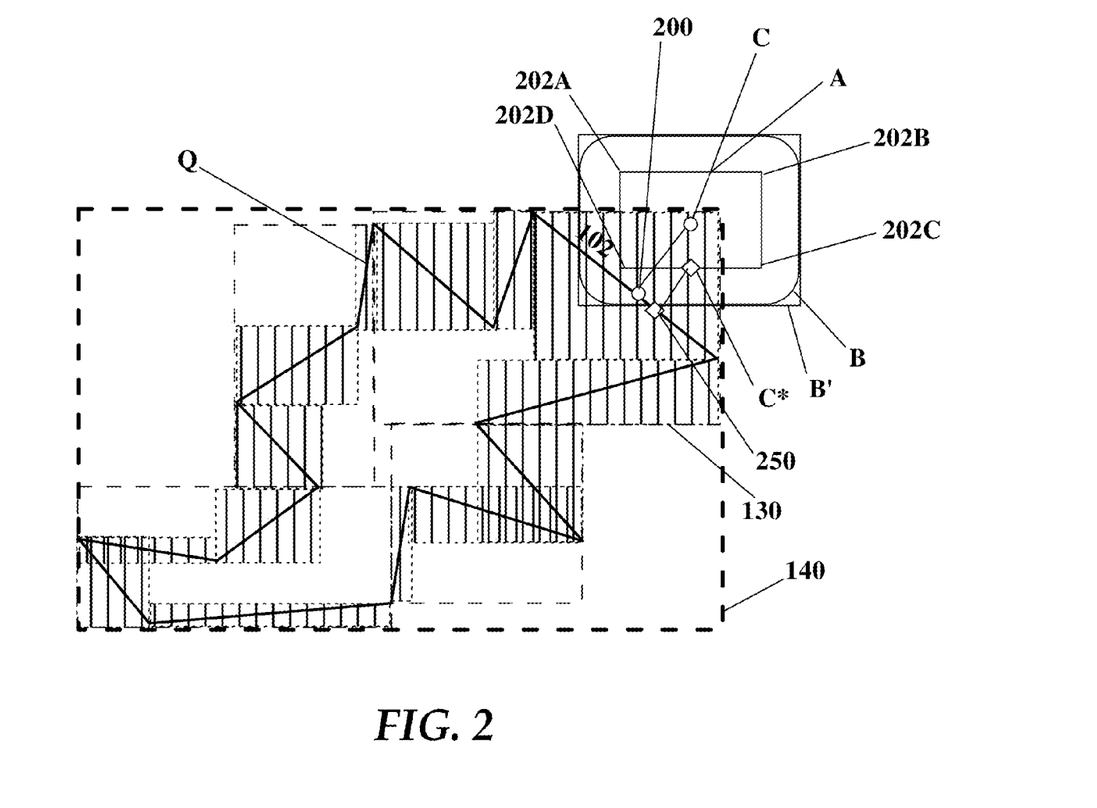
FIG. 2 illustrates an embodiment of a minimum bounding geometry and an expanded bounding geometry.

FIG. 2 illustrates an embodiment of a minimum bounding geometry and an expanded bounding geometry. Minimum bounding geometry A corresponds to a non-leaf node of the R-tree index maintained for the candidate geometries. Expanded bounding geometry B is generated based on minimum bounding geometry A and the query distance specified in the within-distance query. In one embodiment, B may approximated by another minimum bounding geometry B'. For simplicity, both B and B' may be used as the expanded bounding geometry in the embodiments described herein.

The expanded bounding geometry may be generated based on the coordinate system in which the candidate objects are defined, which may include 2D coordinate systems, 3D coordinate systems, orthogonal projections of a 3D coordinate system in 2D, and/or any other coordinate system.

The expanded bounding geometry (i.e. B or B') is used with the IMR-tree of query geometry Q to determine a topological relationship between the expanded bounding geometry and the query geometry Q.

Topological Relationships

The IMR-tree is used to determine a topological relationship between the query geometry and the expanded bounding geometry corresponding to the current R-tree node. Based on the topological relationship, certain optimizations may be performed in processing the within-distance query.

IMR-tree techniques may be used to determine topological relationships between spatial objects, including polygons, points, lines, and collections of points, lines and polygons, including Cartesian as well as geodetic geometries. For example, IMR-Tree techniques may use a filtering step in which some relationships can be completely determined based on one or more optimizations. IMR-Tree techniques may be used in a refining step, in which some relationships, not completely determined in the filtering step, can be determined based on one or more optimizations. The determination of topological relationships is described in further detail in U.S. patent application Ser. No. 13/780,990, entitled "METHODS FOR QUERY PROCESSING OF TOPOLOGICAL RELATIONSHIPS AMONG COMPLEX SPATIAL OBJECTS," filed Feb. 28, 2013, the entire contents of which are hereby incorporated by reference as if fully set forth herein.

Case: Expanded Bounding Geometry does not Intersect Q

If the expanded bounding geometry is outside of the query geometry, it can be concluded that none of the candidate geometries contained within the minimum bounding geometry of the selected node are within the query distance of the query geometry. Because none of these candidate geometries satisfy the within-distance query, nodes in the subtree that descends from the selected node do not need further processing, since they contain the candidate geometries that were determined not to satisfy the within-distance query.

Case: Expanded Bounding Geometry Intersects Q

When the expanded bounding geometry and the query geometry intersect, then one or more candidate geometries contained within the minimum bounding region of the selected node may or may not be within the query distance of the query geometry. As used herein, the term intersection refers to any overlap between two geometries, including the case where one of the geometries is fully contained within another.

Referring to FIG. 2, expanded bounding geometry B' corresponds to minimum bounding geometry A for a particular R-tree node. Using IMR-tree 150 of query geometry Q, it is determined, in the following order, that: (1) expanded bounding geometry B' intersects the minimum bounding geometry 140' associated with root node 140" of IMR-tree 150; (2) expanded bounding geometry B' intersects the minimum bounding geometry 130' associated with non-leaf node 130" of the IMR-tree 150; (3) expanded bounding geometry B' intersects the minimum bounding geometry 102' associated with leaf node 102" of the IMR-tree 150; and (4) expanded bounding geometry B' intersects query geometry Q. The last step is determined by comparing edge 102 with expanded bounding geometry B'. The usage of the IMR-tree to determine topological relationships, including intersections, is described in greater detail in the above cited reference, U.S. patent application Ser. No. 13/780,990.

When the expanded bounding geometry intersects the query geometry, at least one within-distance test is applied. A within-distance test is an optimization that potentially allows all candidate geometries within the minimum bounding region of the selected node to be classified as within the query distance of the query geometry.

If a within-distance test is satisfied, the candidate geometries associated with the selected node are added to the result set. In this case, nodes in the subtree that descends from the selected node do not need further processing. Two example within-distance tests are provided below.

Example within-Distance Test 1

A first example within-distance test is based on whether a bounding region of a current R-tree node is completely contained inside the query geometry. The within-distance test is performed using the IMR-tree. The bounding region used for the test may be the minimum bounding region corresponding to the current R-tree node. This within-distance test is satisfied if the associated bounding region of the selected node is fully contained within the query geometry. Otherwise, this within-distance test is not satisfied.
Example within-Distance Test 2

A second example within-distance test is based on a center point of the minimum bounding region associated with the current R-tree node. In one embodiment, the second example within-distance test is performed after the first example within-distance test is performed but not satisfied.

In the second example within-distance test, a center point of the minimum bounding region associated with the current R-tree node is determined. Then, using the IMR-tree, a closest point of the query geometry to the center point is determined. In the embodiment shown in FIG. 2, C is the center point of the minimum bounding region A associated with the current R-tree node. As previously noted, the traversal of IMR-tree 150 of query geometry Q reached leaf node 102", which corresponds to minimum bounding geometry 102' and edge 102 of query geometry Q. In a simple 2D case where edge 102 is a straight line, the closest point 200 of edge 102 is the intersection of a perpendicular line from center point C of minimum bounding region A to edge 102 of query geometry Q. These principles can be extended to other coordinate systems and other query geometry and/or bounding geometry representations.

The second example within-distance test is satisfied if each extreme point of the minimum bounding geometry is within the query distance of the closest point 200 of the query geometry Q. In the illustrated case, each vertex 202A-202D represents a potential extreme point. Otherwise, the second within-distance test is not satisfied. Checking each vertex 202A-202D is sufficient because one of vertices 202A-202D is the furthest point from closest point 200. Therefore, if each vertex 202A-202D is within the query distance of closest point 200, then all points within minimum bounding region A are within the query distance of closest point 200.

This optimization is not meant to detect every case where the one or more candidate geometries contained within minimum bounding region are within the query distance of closest point 200. Rather, this optimization is meant to detect cases where the simplified calculation will eliminate the need for performing individual calculations on every candidate geometry contained within minimum bounding region A.

This optimization is based on the forward Hausdorff distance, which is defined by max{min{distance(a, q):q∈Q}: a∈A}; where q is any point in query geometry Q and a is any point in minimum bounding region A. The forward Hausdorff distance is described in greater detail in Nutanong, Sarana et al., "An Incremental Hausdorff Distance Calculation Algorithm". However, as the forward Hausdorff distance can be efficiently computed only for a subset of useful geometries, the query distance from the closest point 200 is used as an approximation thereof.
Within-Distance Test Results If a t within-distance test is satisfied, as described above, the candidate geometries associated with the current R-tree node are added to a result set. In one embodiment, candidate geometries associated with all nodes that descend from the current R-tree node are added to the results set.

If none of the within-distance tests are satisfied, then additional processing is required. When the current R-tree node is a non-leaf node, then any child node of the current R-tree node is processed in the manner described above. In one embodiment, processing of the child nodes is recursively performed from a root node of the R-tree index or a subtree of the R-tree index when none of the within-distance tests are satisfied.

In one embodiment, if none of the within-distance tests are satisfied and the current R-tree node is a leaf node of the R-tree index, the candidate geometry corresponding to the leaf node is evaluated as described below.
Leaf-Node Processing When (1) the expanded bounding geometry intersects the query geometry, (2) no within-distance test is not satisfied, and (3) the current R-tree node is a leaf node of the R-tree index, the candidate geometry associated with the current R-tree node is further processed, such as by evaluating the edges of the candidate geometry. It is determined whether the candidate geometry is within the query distance of the query geometry. If so, the candidate geometry is added to the result set.

In one embodiment, a leaf-node approximation optimization is first performed before the actual candidate geometry is directly evaluated. A first leaf node approximation optimization and a second leaf node approximation optimization are described below. In one embodiment, the first leaf node approximation optimization is performed first, the second leaf node approximation optimization is performed if the first leaf node approximation optimization is inconclusive, and the actual candidate geometry is directly evaluated if both leaf node approximation optimizations are inconclusive.

Directly evaluating the actual candidate geometry involves comparing the vertices and/or edges of the candidate geometry and the query geometry to determine if the two geometries are within the query distance. In one embodiment, direct evaluation of the candidate geometry is only performed after the implemented within-distance tests and leaf node approximation optimizations are inconclusive.
Leaf Node Approximation Optimization 1

The first leaf node approximation optimization is based on the principle that at least one point of a candidate geometry touches each boundary surface of its minimum bounding geometry.

For the first leaf node approximation optimization, it is determined whether any boundary surface of the expanded bounding geometry is fully within the query geometry. The term boundary surface refers to a surface in the appropriate number of dimensions. For example, a boundary surface of a 2D bounding region may be a line, and a surface of a 3D bounding region may be a plane. In some bounding region schemes, the plane surface may be curved.

If any boundary surface of the expanded bounding geometry is fully within the query geometry, then the corresponding candidate geometry is within the query distance of the query geometry, and may be added to the result set.
Leaf Node Approximation Optimization 2

The second leaf node approximation optimization is based on a similar principle as the second within-distance test described above, which is based on forward Hausdorff distances.

For the second leaf node approximation optimization, a center point of each boundary surface of the minimum bounding geometry is determined. Then, for each center point of each boundary surface, a closest point of the query geometry is determined. In FIG. 2, C* is the center point of the boundary surface 202C-202D of minimum bounding geometry A, and closest point 250 is the closest point of query geometry Q to center point C*. This is performed for all 4 boundary surfaces of minimum bounding geometry A.

If any point of any boundary surface is within the query distance of its closest point of the query geometry, then the corresponding candidate geometry is within the query distance of the query geometry, and may be added to the result set. For example, for boundary surface 202C-202D, if the distance between any point in boundary surface 202C-202D and closest point 250 is less than or equal to the query distance, then the corresponding candidate geometry is within the query distance of query geometry Q.

Geodetic Coordinate Systems

One or more spatial objects stored in the spatial database system may be defined in one or more geodetic coordinate systems. As used herein, the term "geodetic coordinate system" refers to any coordinate system used to locate places on the Earth. A geodetic coordinate system typically takes into account one or more Earth-specific factors, such as the ellipsoid shape of the Earth. Geodetic coordinate systems may describe locations on Earth in a 2D or a 3D coordinate system. The techniques described herein may be adapted for any appropriate geodetic coordinate system.

In one embodiment, the minimum bounding geometries are minimum bounding boxes defined in a 3D Earth-centered coordinate system, and 2D geodetic coordinates are converted to coordinates in the 3D Earth-centered coordinate system. In this case, the R-tree index of candidate geometries is based on 3D minimum bounding boxes (MBBs). The techniques described herein with 2D examples are adaptable to other coordinate systems, including geodetic coordinate systems.

Geodetic Example: Expanded Bounding Box

Figure 3:
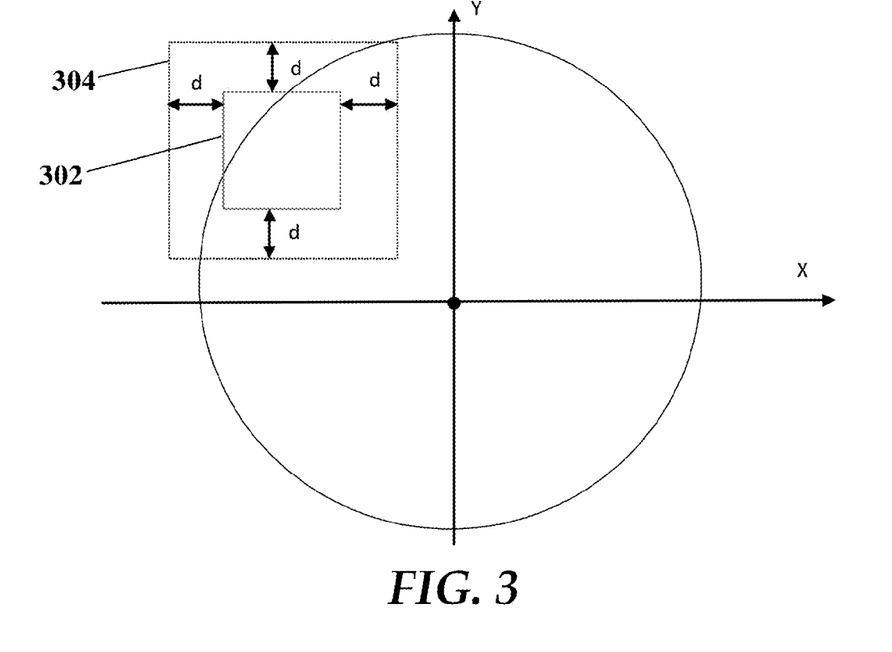
FIG. 3 illustrates an embodiment of minimum bounding geometry expansion in 3D.

FIG. 3 illustrates an embodiment of minimum bounding geometry expansion in 3D. FIG. 3 is an orthographic projection of the world centered on the geographic North Pole; therefore, the Z axis is not shown. MBB 302 corresponds to a node of an R-tree index of candidate geometries. MBB 302 and the query distance d are used to generate an expanded bounding region. For example, in FIG. 3, the expanded bounding region is an expanded bounding box 304. Every boundary surface of expanded bounding box 304 is distance d away from the corresponding surface of MBB 302. Note that, although the perspective of FIG. 3 does not show the expansion in the Z direction, the expansion in the Z direction is made to expanded bounding box 304. The bounding box shape is used to facilitate calculations; although certain portions of expanded bounding box 304 are more than distance d away from MBB 302, the approximations and optimizations described herein are still valid.

Figure 4:
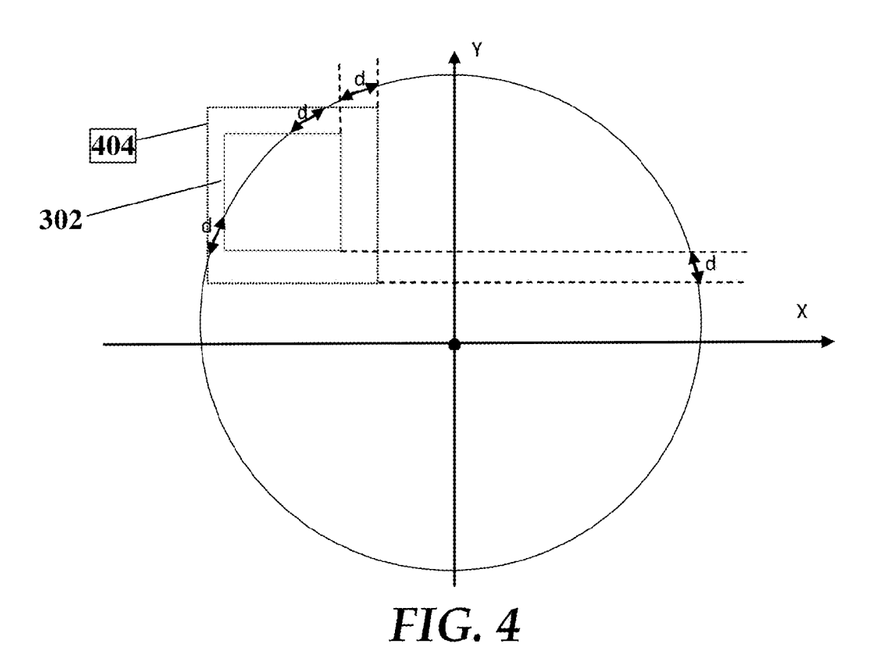
FIG. 4 illustrates an embodiment of minimum bounding geometry expansion in 3D using ellipsoid distance.

FIG. 4 illustrates an embodiment of minimum bounding geometry expansion in 3D using ellipsoid distance. FIG. 4 is also an orthographic projection of the world centered on the geographic North Pole. As shown in FIG. 3, a simple way is to expand a MBB in 3D is to expand MBB 302 by query distance d in both directions of each dimension. However, this expansion can be unnecessarily large. Specifically, if it can be determined that the candidate geometries generally lie on or near the Earth surface, a spherical, ellipsoid or other geoid distance may be used. The query distance d is expanded as a spherical, ellipsoid or other geoid distance, resulting in a more conservative expansion of MBB 302 to generate expanded bounding box 404. Expanded bounding box 404 is smaller than the expanded bounding box 304, which will lead to more accurate approximations and optimizations.

Geodetic Example: Center Points

The second example within-distance test described above uses the center of a minimum bounding region. In the geodetic case, this corresponds to the center of a 3D minimum bounding region. A further geodetic adaptation is to do a projection from the center point of the 3D minimum bounding region to a new point on the Earth and use the new point to find its closest point in the query geometry.

The second leaf node approximation optimization uses the center point of each of the boundary surfaces of a minimum bounding region of a candidate geometry. In the geodetic case, another geodetic adaptation is to perform a projection from the center of a boundary surface to a new point on Earth.

Figure 5:
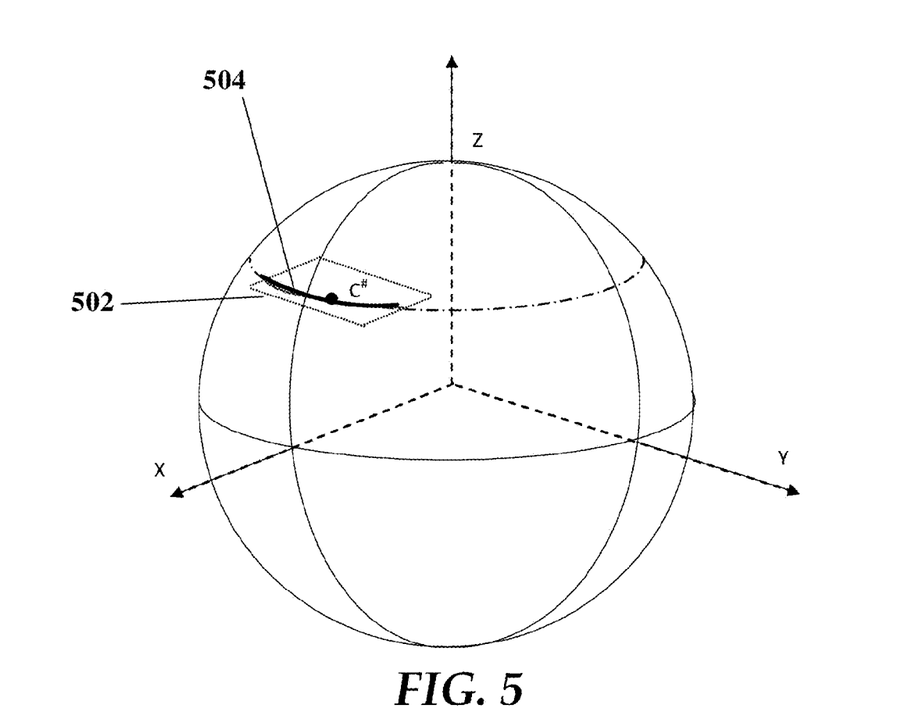
FIG. 5 illustrates an embodiment of determining a center point in a minimum bounding geometry.

Another geodetic adaptation is to determine the center of a line enclosed by a boundary surface. In FIG. 5, one boundary surface 502 of a candidate geometry's minimum bounding region is shown. The boundary surface 502 intersects with the Earth surface at line 504. The center point C* of line 504 may be used.

Geodetic Example: Extreme Points

As described above, the second example within-distance test is satisfied if each vertex of the associated minimum bounding geometry is within the query distance of the closest point to the center of the minimum bounding geometry. Each vertex is tested because the vertices represent the extreme points of the minimum bounding geometry. In the geodetic case, an adaptation may be made, as shown in FIG. 6.

Figure 6:
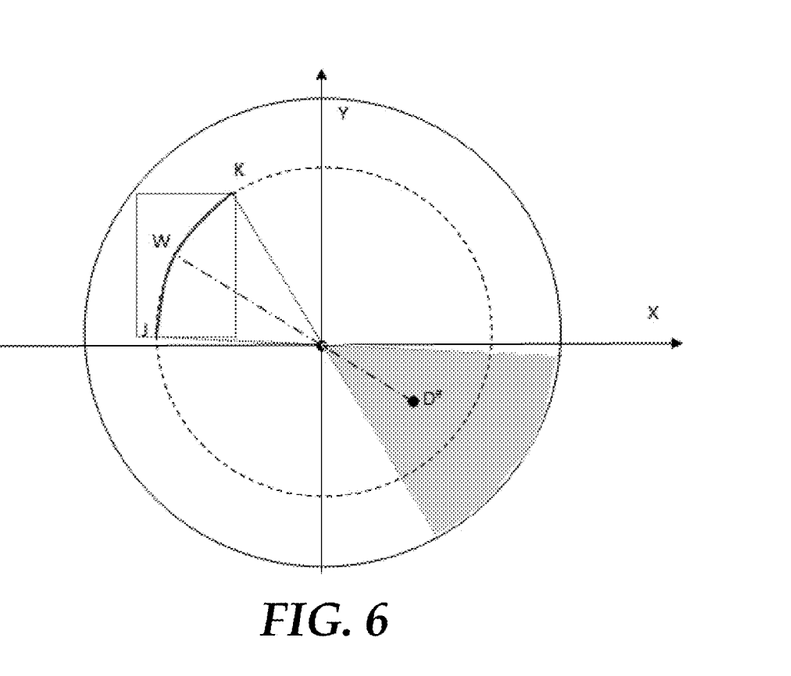
FIG. 6 illustrates an embodiment of determining an extreme point in a minimum bounding geometry.

FIG. 6 illustrates an embodiment of determining an extreme point in a minimum bounding geometry. FIG. 6 is an orthographic projection of the world centered on the geographic North Pole; therefore, the Z axis is not shown. The closest point D* of the query geometry to the center point of the MBB is illustrated. If all the extreme points of the MBB are within the query distance of D*, then any candidate geometry enclosed by the MBB are within the query distance distance of the query geometry.

To determine these extreme points, each of the 6 sides of the MBB is evaluated. For each side, its intersection with the Earth's surface is evaluated. Surface line JK is the intersection of one side of a MBB with the Earth's surface. The extreme point of surface line JK is determined relative to the orientation of surface line JK with respect to the closest point of the query geometry, D*. The shaded region of FIG. 6 is opposite line JK. If closest point D* is not in the shaded region, either point J or point K can be the candidate geometry MBB is the extreme point, or the maximally far point from D*. When closest point D* in the query geometry is in the shaded region, the extreme point is point W. In this manner, the extreme point can be determined for each of the six surfaces of the MBB.

Process for Performing a within-Distance Query

Figure 7:
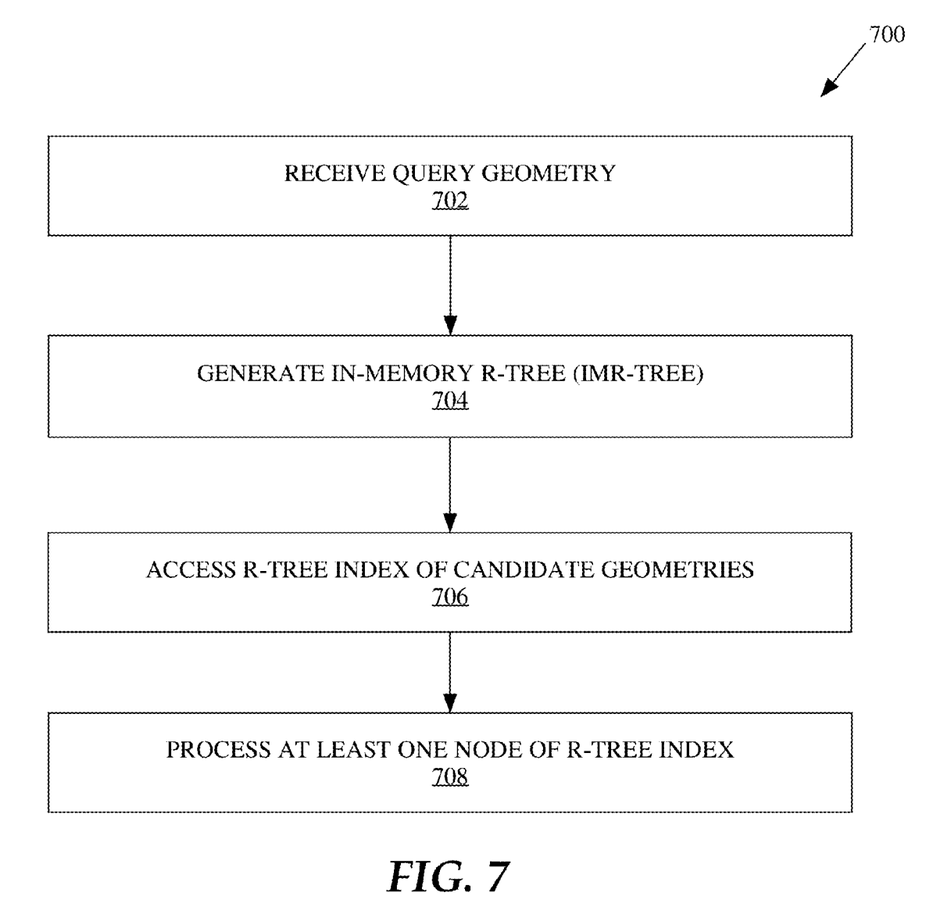
FIG. 7 is a flow diagram that illustrates an embodiment of a process for performing a with in-distance query.
Figure 9:
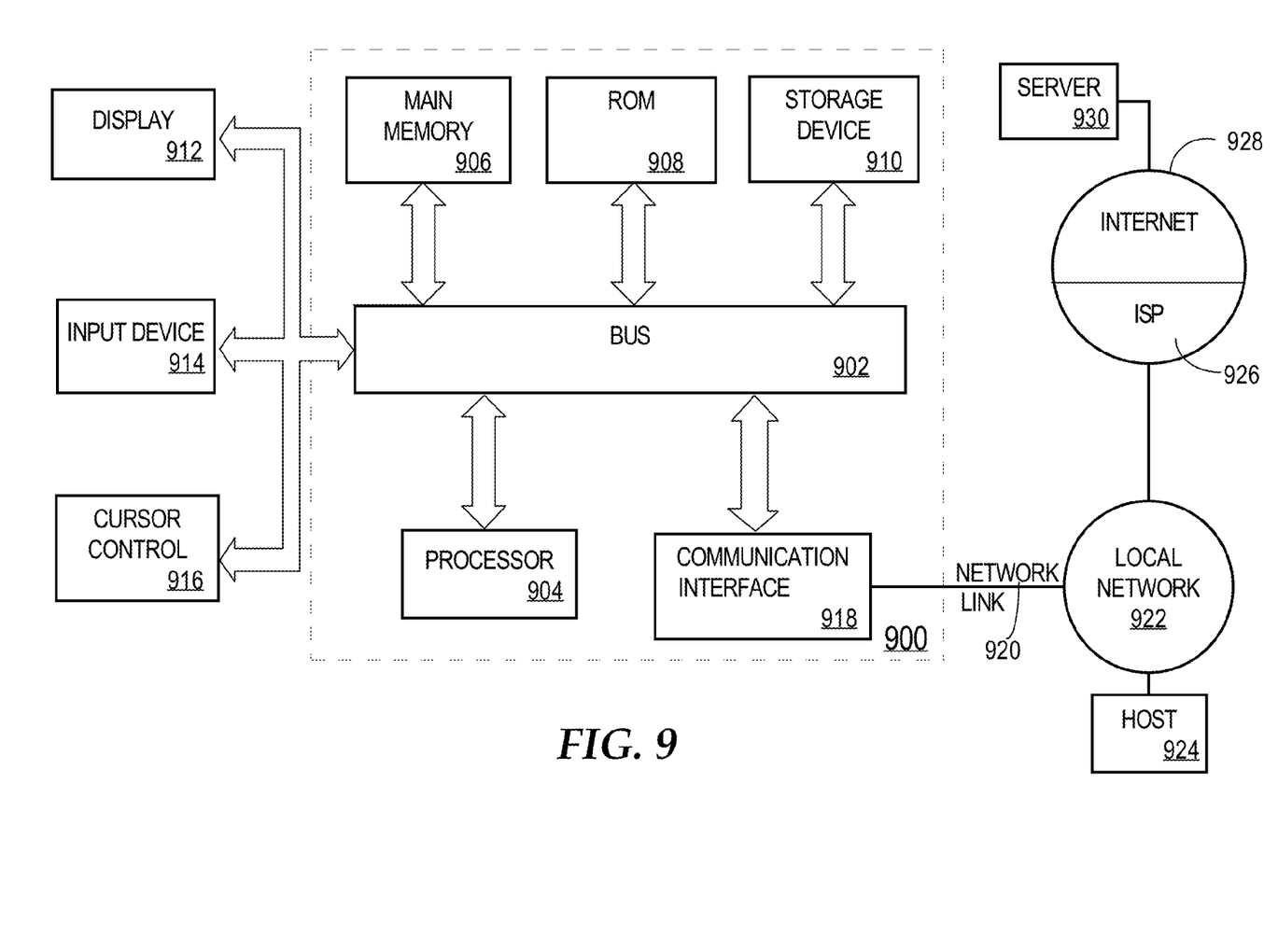
FIG. 9 illustrates a computer system upon which one or more embodiments may be implemented.

FIG. 7 is a flow diagram that illustrates an embodiment of a process for performing a within-distance query. Process 700 may be performed by one or more computing devices, such as one or more spatial database systems. For example, one or more blocks of process 700 may be performed by computer system 900.

At block 702, a query geometry is received. In one embodiment, the query geometry is part of a query for candidate geometries within a query distance of the query geometry. In one embodiment, the candidate geometries and/or query geometry are spatial data objects stored in a spatial database system, such as a GIS.

At block 704, an in-memory R-tree (IMR-tree) is generated for the query geometry. The IMR-tree includes a plurality of nodes corresponding to edges of the query geometry. In FIG. 1B, an example of an IMR-tree is provided that corresponds to the geometry shown in FIG. 1A.

At block 706, an R-tree index is accessed. The R-tree index indexes a plurality of candidate geometries that may be returned if they satisfy the query. The R-tree index includes a plurality of nodes corresponding to minimum bounding geometries of one or more of the candidate geometries. In one embodiment, the R-tree index is maintained by a spatial database system storing the plurality of candidate geometries, which may or may not be the same database system performing process 700.

At block 708, at least one node of the R-tree index is processed. Processing of a node of the R-tree index is described in greater detail hereafter. In one embodiment, processing is recursively performed from the root node of the R-tree index. When the search is limited to a region completely within the region represented by a subtree of the R-tree index, processing may be recursively performed from the root node of the subtree of the R-tree index.

Process for Performing a within-Distance Query

Figure 8:
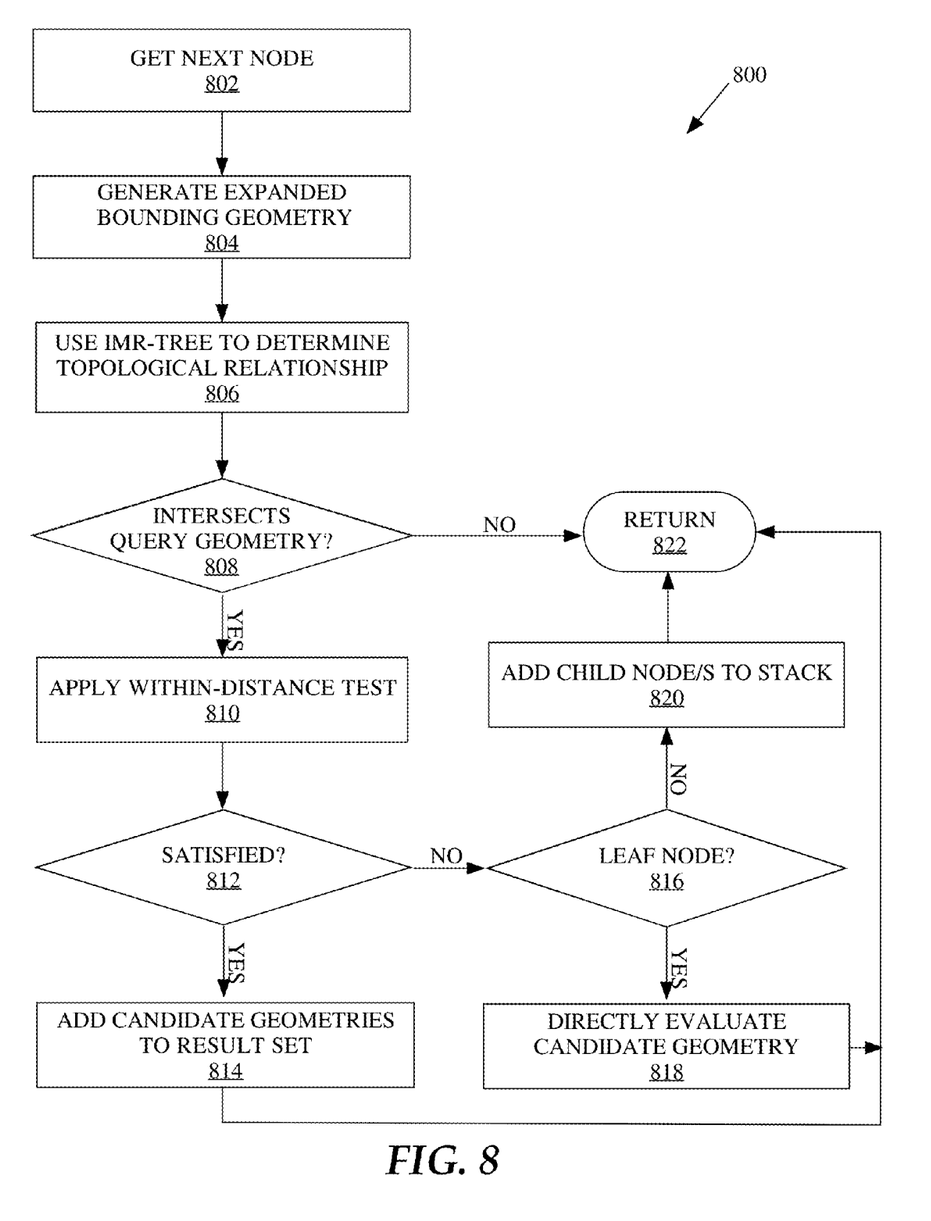
FIG. 8 is a flow diagram that illustrates an embodiment of a process for performing a within-distance query by processing one or more nodes of an R-tree index of candidate geometries.

FIG. 8 is a flow diagram that illustrates an embodiment of a process for performing a within-distance query by processing one or more nodes of an R-tree index of candidate geometries. Process 800 may be performed by one or more computing devices, such as one or more spatial database systems. For example, one or more blocks of process 800 may be performed by computer system 900. The within-distance query is a query for geometry objects within a query distance of a query geometry.

At block 802, a node is obtained for processing. In one embodiment, the first node that is processed is the root node of an R-tree index comprising candidate geometries that may be returned in the search if the query is satisfied. If only a subtree of the R-tree index is searched, then the first node that is processed is the root node of the subtree of the R-tree index. For example, the search may be limited to a region completely within the region represented by a subtree of the R-tree index. However, for nodes corresponding to regions that are out-of-range, process 800 efficiently processes such nodes, so pre-processing the R-tree index to determine such a subtree is allowable but not necessary.

At block 804, an expanded bounding geometry is generated based on the query distance. The expanded bounding geometry is generated by expanding a minimum bounding geometry corresponding to the selected node.

At block 806, the IMR-tree is used to determine a topological relationship between the expanded bounding geometry and the query geometry. The IMR-tree includes a plurality of nodes corresponding to edges of the query geometry. FIG. 2 illustrates an example of an IMR-tree, which may include leaf nodes (corresponding to minimum bounding geometries of individual edges of the query geometry) and non-leaf nodes (each corresponding to a minimum bounding geometry that contains all minimum bounding geometries and/or edges of nodes that descend from it). Determining the topological relationship involves traversing at least one node of the IMR-tree to compare the expanded bounding geometry of the R-tree node to the query geometry data contained in the IMR-tree. In one embodiment, the topological relationship determined is whether the expanded bounding geometry intersects the query geometry.

At decision block 808, it is determined whether the query geometry intersects the expanded bounding geometry corresponding to the node. When the expanded bounding geometry does not intersect the query geometry, processing continues to block 822, where process 800 returns and/or terminates. For example, processing may continue to processing a successive node (e.g. in a recursive process), passing control to a calling process, generating any appropriate record or notification, returning after a method or function invocation, or terminating.

Returning to decision block 808, if the expanded bounding geometry intersects the query geometry, processing continues to block 810. At block 810, a within-distance test is applied, such as example within-distance test 1 and example within-distance test 2, described above.

At decision block 812, if the within-distance test is satisfied, processing continues to block 814. If the within-distance test is satisfied, then all the candidate geometries represented by the node satisfy the query. At block 814, the candidate geometries represented by the node are added to the result set.

Returning to decision block 812, if the within-distance test is not satisfied, processing continues to decision block 816, where it is determined whether the current node is a leaf node in the R-tree. If the current node is a leaf node, processing continues to block 818, where a candidate geometry represented by the current node is further evaluated to determine whether candidate geometry is within the query distance of the query geometry. The candidate geometry may be evaluated by comparing the actual candidate geometry boundaries to the query geometry using the IMR-tree. In one embodiment, a leaf-node approximation optimization is first performed before the actual candidate geometry is directly evaluated.

If the candidate geometry is within the query distance of the query geometry, the candidate geometry is added to the result set.

Returning to decision block 816, if it is determined that the current node is not a leaf node in the R-tree, processing continues to block 820. At block 820, any child node/s of the current node is processed. In one embodiment, process 800 is recursive, and is performed recursively on the child node/s of the current node. Although step 820 recites adding the child node/s to a stack as a method for tracking recursion in a serial recursive process, processing may be performed using any recursive method, including one or more parallel and/or multi-threaded methods.

At block 822, process 800 returns and/or terminates. After no more nodes need to be processed, the result set contains the results of the within-distance query. A response to the within-distance query comprising the result set may be sent. In one embodiment, process 800 is a recursive process, and the response to the within-distance query is sent after no more nodes need to be recursively processed.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving a query for geometry objects within a query distance of a query geometry;
generating an in-memory R-tree (IMR-tree) for the query geometry, the IMR-tree comprising a plurality of nodes corresponding to edges of the query geometry;
accessing an R-tree index that indexes a plurality of candidate geometries, the R-tree index comprising a plurality of nodes corresponding to minimum bounding geometries;
performing a processing step on at least one node of the R-tree index, wherein
performing the processing step on a selected node of the R-tree index comprises:
generating, based on the query distance, an expanded bounding geometry of a minimum bounding geometry corresponding to the selected node;
using the IMR-tree to determine a topological relationship between the expanded bounding geometry and the query geometry;
when the expanded bounding geometry intersects the query geometry:
determining whether at least one within-distance test applied to the minimum bounding geometry is satisfied;
if the at least one within-distance test is satisfied, adding candidate geometries associated with the selected node to a result set;
if the at least one within-distance test is not satisfied and the selected node is a non-leaf node of the R-tree index, performing the processing step on at least one child node of the selected node;
if the at least one within-distance test is not satisfied and the selected node is a leaf node of the R-tree index:
determining whether a within-distance test based on leaf node approximation is satisfied;
if said within-distance test based on leaf node approximation is satisfied, adding a candidate geometry associated with the selected node to a result set;
wherein the method is performed by one or more computing devices.

2. The method of claim 1, wherein the at least one within-distance test comprises determining whether the minimum bounding geometry corresponding to the selected node is fully contained within the query geometry based on the IMR-tree.

3. The method of claim 1, wherein the at least one within-distance test comprises:
determining a closest point of the query geometry to a center point of minimum bounding geometry corresponding to the selected node;
determining whether each extreme point of the minimum bounding geometry is within the query distance of the closest point of the query geometry.

4. The method of claim 1, wherein processing the selected node further comprises:
when the expanded bounding geometry intersects the query geometry, the at least one within-distance test is not satisfied, and the selected node is a leaf node of the R-tree index:
determining whether an associated candidate geometry of the selected node is within the query distance of the query geometry, and
adding the associated candidate geometry to the result set when the associated candidate geometry is within the query distance of the query geometry.

5. The method of claim 1, wherein determining whether the associated candidate geometry is within the query distance of the query geometry comprises:
determining whether any boundary surface of the expanded bounding geometry is fully within the query geometry;
when it is determined that at least one boundary surface of the expanded bounding geometry is fully within the query geometry, adding the associated candidate geometry to the result set.

6. The method of claim 1, wherein determining whether the associated candidate geometry is within the query distance of the query geometry comprises:
for each boundary surface of the minimum bounding geometry, determining a corresponding closest point of the query geometry;
if any point of any boundary surface of the minimum bounding geometry is within the query distance of the corresponding closest point of the query geometry, adding the associated candidate geometry to the result set.

7. The method of claim 1, wherein adding candidate geometries associated with the selected node to the result set further comprises adding, to the result set, candidate geometries associated with nodes that descend from the selected node.

8. The method of claim 1, wherein processing the at least one node of the R-tree index is recursively performed from a root node of the R-tree index or a subtree of the R-tree index.

9. The method of claim 1, wherein generating the expanded bounding geometry is based on one of a spherical, ellipsoid or other geoid distance in a geodetic coordinate system.

10. The method of claim 1, wherein the R-tree index is maintained by a spatial database system storing the plurality of candidate geometries.

11. A non-transitory computer-readable medium storing instructions which, when executed by one or more processors, cause performance of:
receiving a query for geometry objects within a query distance of a query geometry;
generating an in-memory R-tree (IMR-tree) for the query geometry, the IMR-tree comprising a plurality of nodes corresponding to edges of the query geometry;
accessing an R-tree index that indexes a plurality of candidate geometries, the R-tree index comprising a plurality of nodes corresponding to minimum bounding geometries;
performing a processing step on at least one node of the R-tree index, wherein performing the processing step on a selected node of the R-tree index comprises:
generating, based on the query distance, an expanded bounding geometry of a minimum bounding geometry corresponding to the selected node;

using the IMR-tree to determine a topological relationship between the expanded bounding geometry and the query geometry;

when the expanded bounding geometry intersects the query geometry:

determining whether at least one within-distance test applied to the minimum bounding geometry is satisfied;

if the at least one within-distance test is satisfied, adding candidate geometries associated with the selected node to a result set;

if the at least one within-distance test is not satisfied and the selected node is a non-leaf node of the R-tree index, performing the processing step on at least one child node of the selected node;

if the at least one within-distance test is not satisfied and the selected node is a leaf node of the R-tree index:

determining whether a within-distance test based on leaf node approximation is satisfied;

if said within-distance test based on leaf node approximation is satisfied, adding a candidate geometry associated with the selected node to a result set.

12. The non-transitory computer-readable medium of claim 11, wherein the at least one within-distance test comprises determining whether the minimum bounding geometry corresponding to the selected node is fully contained within the query geometry based on the IMR-tree.

13. The non-transitory computer-readable medium of claim 11, wherein the at least one within-distance test comprises:

determining a closest point of the query geometry to a center point of the minimum bounding geometry corresponding to the selected node;

determining whether each extreme point of the minimum bounding geometry is within the query distance of the closest point of the query geometry.

14. The non-transitory computer-readable medium of claim 11, wherein processing the selected node further comprises:

when the expanded bounding geometry intersects the query geometry, the at least one within-distance test is not satisfied, and the selected node is a leaf node of the R-tree index:

determining whether an associated candidate geometry of the selected node is within the query distance of the query geometry, and adding the associated candidate geometry to the result set when the associated candidate geometry is within the query distance of the query geometry.

15. The non-transitory computer-readable medium of claim 11, wherein determining whether the associated candidate geometry is within the query distance of the query geometry comprises:

determining whether any boundary surface of the expanded bounding geometry is fully within the query geometry;

when it is determined that at least one boundary surface of the expanded bounding geometry is fully within the query geometry, adding the associated candidate geometry to the result set.

16. The non-transitory computer-readable medium of claim 11, wherein determining whether the associated candidate geometry is within the query distance of the query geometry comprises:

for each boundary surface of the minimum bounding geometry, determining a corresponding closest point of the query geometry;

if any point of any boundary surface of the minimum bounding geometry is within the query distance of the corresponding closest point of the query geometry, adding the associated candidate geometry to the result set.

17. The non-transitory computer-readable medium of claim 11, wherein adding candidate geometries associated with the selected node to the result set further comprises adding, to the result set, candidate geometries associated with nodes that descend from the selected node.

18. The non-transitory computer-readable medium of claim 11, wherein processing the at least one node of the R-tree index is recursively performed from a root node of the R-tree index or a subtree of the R-tree index.

19. The non-transitory computer-readable medium of claim 11, wherein generating the expanded bounding geometry is further based on one of a spherical, ellipsoid or other geoid distance in a geodetic coordinate system.

20. The non-transitory computer-readable medium of claim 11, wherein the instructions further comprise instructions that cause performance of:

storing the plurality of candidate geometries; and
maintaining the R-tree index.

* * * * *

UNITED STATES PATENT AND TRADEMARK OFFICE
CERTIFICATE OF CORRECTION

PATENT NO. : 9,910,878 B2
APPLICATION NO. : 14/452351
DATED : March 6, 2018
INVENTOR(S) : Hu et al.

Page 1 of 1

It is certified that error appears in the above-identified patent and that said Letters Patent is hereby corrected as shown below:

In the Specification

In Column 10, Line 37, delete "distance distance" and insert -- distance --, therefor.

Signed and Sealed this
Fourteenth Day of August, 2018

Andrei Iancu
*Director of the United States Patent and Trademark Office*